No. 812,202. PATENTED FEB. 13, 1906.
W. A. GREENLAW.
FLEXIBLE JOINT FOR PIPES.
APPLICATION FILED MAY 13, 1905.
2 SHEETS—SHEET 1.
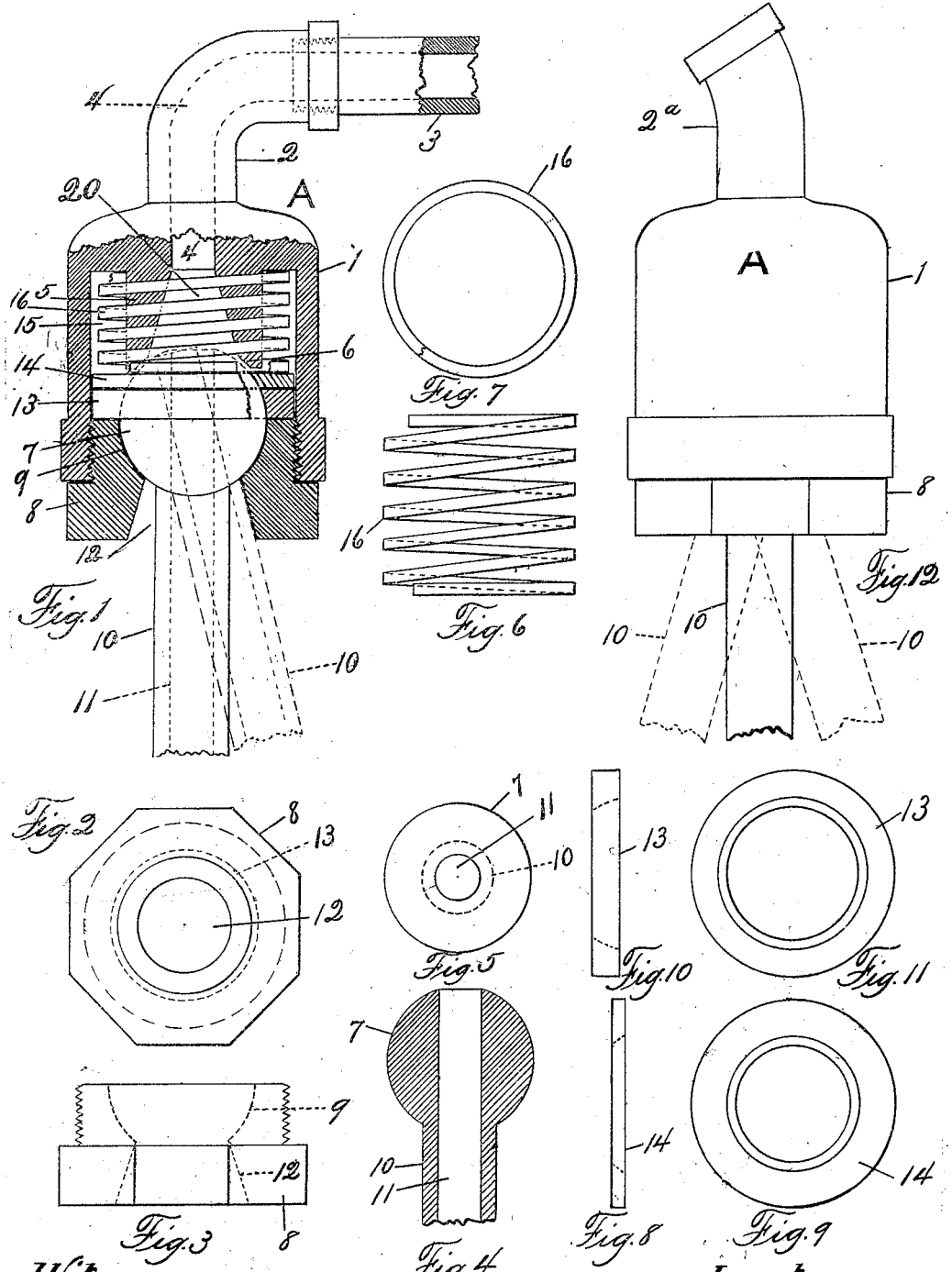
Witnesses:
Busie G. Morris
G. Henry Parker
Inventor:
Warren A. Greenlaw
BY Wm. A. Copeland
Attorney No. 812,202. PATENTED FEB. 13, 1906.
W. A. GREENLAW.
FLEXIBLE JOINT FOR PIPES.
APPLICATION FILED MAY 13, 1905.

2 SHEETS—SHEET 2.

Witnesses:
Bessie G Morris
J. Henry Parker

Inventor:
Warren A. Greenlaw
BY Wm A. Copeland
Attorney

UNITED STATES PATENT OFFICE.

WARREN A. GREENLAW, OF BOSTON, MASSACHUSETTS, ASSIGNOR OF ONE-HALF TO WESLEY W. BLAIR, OF NEWTON, MASSACHUSETTS.

FLEXIBLE JOINT FOR PIPES.

No. 812,202.     Specification of Letters Patent.     Patented Feb. 13, 1906.

Application filed May 13, 1905. Serial No. 260,283.

*To all whom it may concern:*

Be it known that I, WARREN A. GREENLAW, of Boston, in the county of Suffolk and State of Massachusetts, have invented certain new and useful Improvements in Flexible Joints for Pipes, of which the following is a specification.

In making connection between the train-pipes of two cars or between the locomotive and the car for the passage of air for the air-brake or of steam for heating if the connection is made by another pipe instead of by a flexible hose there are required five joints to make a connection as usually made.

The object of the present invention is to provide a flexible joint for the passage of either steam or air, whereby the number of joints required in making a separable connection between two cars may be reduced.

The invention comprises a head adapted to be separably connected at one end with the train-pipe and having a passage therethrough, a tubular plug adapted to be screwed into the other end of said head, and a ball which is adapted to be inclosed in a chamber between said head and said plug when the head and plug are connected, the plug and head being formed with concave seats for the ball. The ball has a passage therethrough which is in alinement with the passages through said head and plug, and a tubular stem is connected with or formed integral with said ball which is adapted to be connected with another pipe by a screw-thread or other suitable connection. The passage through the plug is larger than the diameter of the stem of the ball-joint to permit both a swiveling movement of the joint and also a universal movement to adapt it to the vibrations of the car.

The invention will now be fully described, reference being had to the accompanying drawings, and the novel features thereof will be particularly pointed out in the claims at the close of the specification.

Figure 13:
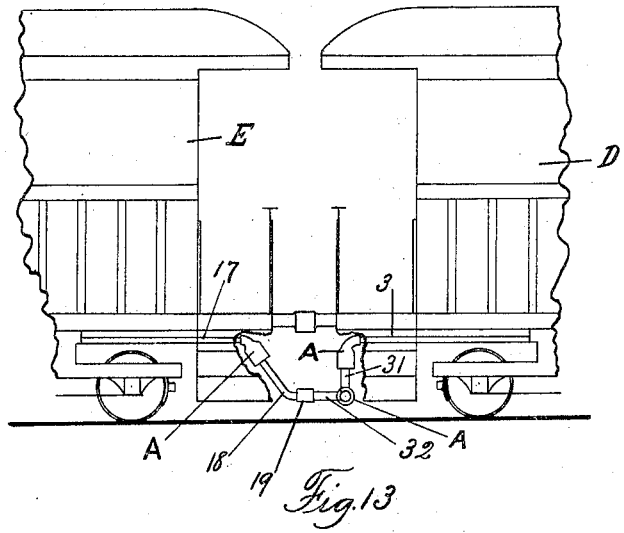
Figure 14:
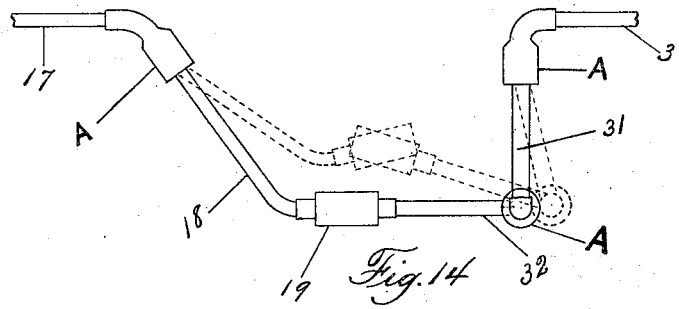
Figure 15:
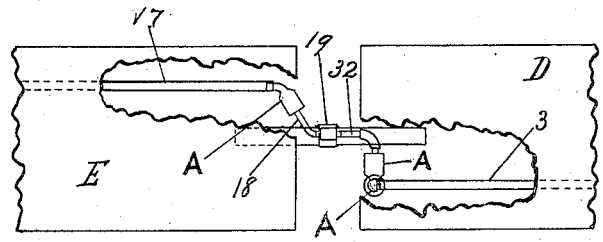

In the drawings, Figure 1 is an elevation, partly in longitudinal section, of a device embodying the invention. Fig. 2 is an end view of Fig. 1, the ball being removed. Fig. 3 is a side elevation of the lower member of the device shown in Fig. 1 detached. Fig. 4 is a longitudinal section of the ball and stem detached. Fig. 5 is an end view of Fig. 4. Figs. 6 and 7 are respectively detail side and end views of the spring which holds the ball-joint on its seat. Figs. 8 and 9 are respectively detail side and end views of the brass ring which rests on the gasket. Figs. 10 and 11 are respectively side and end views of the gasket. Fig. 12 is a side elevation of the joint, showing a sixteenth bend in the neck instead of a quarter, as in Fig. 1. Fig. 13 shows the device as applied to the steam-pipe or air-brake pipe of a train of cars. Fig. 14 is an enlarged view of the connections between two cars shown in Fig. 13. Fig. 15 is a plan of the car connections shown in Fig. 13.

In the drawings, A represents the joint as a whole. The head 1 is a shell having a neck 2, which may be either straight or formed with an elbow at any angle desired to adapt it to the application intended. The neck is adapted to be connected, as by a screw-thread, with the pipe 3, which may be the train-pipe. A passage 4 leads through the neck into the interior of the head and through an annular flange 5. Preferably the passage 20 through the flange is made flaring, enlarging inwardly, and the ends of the flange 5 are concaved on the inner corners to form an annular concave seat 6 for the ball 7, the concavity being on the arc of a circle. The mouth of the head or shell is tapped out and is adapted for connection with a screw-threaded annular plug 8. Said plug 8 is concaved on the inner end on the arc of a circle to form a seat 9 for the ball 7, the diameter of the circle being just enough larger than the diameter of the ball 7 to form a close sliding fit. The diametrical distance between the concave seat 6 in the head and the seat 9 in the plug should preferably be a little more than the diameter of the ball 7, so as to allow a slight movement of the ball forward and back, as well as a turning movement.

The ball 7 is formed with a tubular stem 10, which at its outer end is adapted to be connected with another pipe or with a coupling, as by a screw-thread or other means. The stem is shown broken away in Figs. 1, 4, and 12, and the thread is therefore not shown, but will be well understood. A passage 11 extends through the stem and ball. The plug 8 is formed with a hole 12, through which the stem of the ball passes, the inner end of the hole being somewhat larger in diameter than the stem 10 and flares outwardly, so as to allow for a lateral movement of the stem in any direction within the angle permitted by the flare of the hole 12, as shown by the dotted lines in Fig. 1. The plug 8 is preferably formed with a polygonal periphery, so that it may be engaged by a wrench to screw it onto the head. Seated on the inner end of the plug is a gasket 13, which has a flaring passage, preferably concaved to fit the convex surface of the ball and form a tight joint. On the gasket is a brass or other metal ring 14, whose inner periphery is also concaved to fit the convex surface of the ball and form a close joint.

The annular flange 5 forms an annular chamber 15 between the flange and the wall of the shell, within which is a coiled spring 16, surrounding the flange, one end of the spring abutting against the brass ring 14 and the other end abutting against the rear end of the said chamber 16. This spring acting through the brass ring holds the gasket in contact with the ball 7 and normally holds the ball on its seat in the plug. It yields, however, to allow a slight rearward movement of the ball to soften the shock when the two cars are brought together.

In the modification shown in Fig. 12 the only difference from Fig. 1 is in the angle of the crook in the neck 2ª.

In the application of the joint shown in Figs. 13, 14, and 15 two cars D E are represented provided, respectively, with train-pipes 3 17, the pipe 3 being connected with a pipe 31 by a joint A, constructed in accordance with my invention, and the pipe 31 being connected with the pipe 32 by another similar joint A. The train-pipe 17 is connected with pipe 18 by a joint A, constructed in accordance with my invention, the neck of the joint being shown as having a crook of a differer angle from the joints in the other pipe. Pipe 18 is connected with pipe 32 by a coupling 19 of any suitable construction. Suitable couplings for this purpose are in well-known use.

While the invention has been described especially as for use in connection with cars, it is obvious that it is adapted for use wherever a flexible joint in a pipe is required.

The diameter of the larger end of the flaring passage through the annular flange in the head is larger than the diameter of the passage through the ball, so that as the ball rolls on its seat the passage in the ball will not be cut off from connection with the passage through the flange. The passage 12 through the plug 8 is of sufficient width in its narrowest part to allow all the range of movement that would reasonably be required of the stem 10 of the ball. The side walls of the passage 12 flare, so that as the stem swings to one side or the other it will contact with the wall the full length of the passage instead of at a single point. The width of the narrower end of the passage 12 should be no greater than the wider end of the passage in the flange, so that the stem will engage the side of the passage 12 and prevent the turning of the ball far enough to cut off the connection of the passage between the ball and the head.

I claim as my invention—

1. A flexible pipe-joint, comprising a chambered head having a neck with a passage therethrough into the chamber, a tubular plug having a separable connection with the mouth of said head, a ball inclosed in the chamber between said head and plug, a concave annular seat for said ball on the inner end of said plug, a stem projecting from said ball out through the hole in the plug, a passage through said stem and ball into the interior of the chamber, the passage through the plug being larger than the diameter of said stem, an annular gasket fitted over said ball and resting on the inner end of the plug when the ball is on its seat, the hole in the gasket being of less diameter at its inner end than the diameter of the ball so that the gasket is seated on the ball as well as on the plug, whereby the rearward movement of the ball carries with it the said gasket and washer, an annular flange on the interior of the head around the opening from the neck, said flange projecting into the chamber in the head, a coil-spring surrounding said flange, one end of said spring being seated on said metallic washer and the other end bearing against the rear wall of the chamber, said spring normally holding said ball and gasket to their seats in said tubular plug, and holding said ball and washer away from their seats on said flange.

2. A flexible pipe-joint, comprising a chambered head having a neck with a passage therethrough into the chamber, a tubular plug having a separable connection with the mouth of said head, a ball inclosed in the chamber between said head and plug, a concave annular seat for said ball on the inner end of said plug, a stem projecting from said ball out through the hole in the plug, a passage through said stem and ball into the interior of the chamber, the passage through the plug being larger than the diameter of said stem, an annular gasket fitted over said ball and resting on the inner end of the plug when the ball is on its seat, the hole in the gasket being of less diameter at its inner end than the diameter of the ball so that the gasket is seated on the ball as well as on the plug, an annular metal washer resting on the said gasket, the hole in the washer being of less diameter than that of the hole in the gasket and tapering so as to be seated on the ball as well as on the gasket, whereby the rearward movement of the ball carries with it the said gasket and washer, an annular flange on the interior of the head around the opening from the neck, said flange projecting into the chamber in the head, and having a concave seat for the ball when the ball is pushed backward from its seat on the plug, a coil-spring surrounding said flange, one end of said spring being seated on said metallic washer and the other end bearing against the rear wall of the chamber, said spring normally holding said ball and gasket to their seats in said tubular plug, and holding said ball and washer away from their seats on said flange.

In testimony whereof I have affixed my signature in presence of two witnesses.

WARREN A. GREENLAW.

Witnesses:
WILLIAM A. COPELAND,
WESLEY W. BLAIR.